United States Patent [19]

Dietz et al.

[11] Patent Number: 5,466,807
[45] Date of Patent: Nov. 14, 1995

[54] PERYLENE COMPOUNDS CONTAINING SULFONIC ACID GROUPS PROCESS FOR PREPARING THEM AND THEIR USE

[75] Inventors: Erwin Dietz, Kelkheim; Manfred Urban, Wiesbaden, both of Germany

[73] Assignee: Hoechst Aktiengesellschaft, Frankfurt am Main, Germany

[21] Appl. No.: 829,045

[22] PCT Filed: Aug. 9, 1990

[86] PCT No.: PCT/EP90/01312

§ 371 Date: Mar. 9, 1992

§ 102(e) Date: Mar. 9, 1992

[87] PCT Pub. No.: WO91/02032

PCT Pub. Date: Feb. 21, 1991

[30] Foreign Application Priority Data

Aug. 11, 1989 [DE] Germany .......................... 39 26 563.3

[51] Int. Cl.⁶ ........................... C09B 5/62; C07D 471/06
[52] U.S. Cl. ..................... 546/6; 546/10; 546/37
[58] Field of Search ..................... 546/6, 10, 37

[56] References Cited

U.S. PATENT DOCUMENTS

| | | | |
|---|---|---|---|
| 3,544,303 | 12/1970 | Swidler et al. | 71/94 |
| 4,431,806 | 2/1984 | Spietschka et al. | 546/37 |
| 4,599,408 | 7/1986 | Spietschka et al. | 546/37 |
| 4,607,097 | 8/1986 | Kano et al. | 546/37 |
| 4,667,036 | 5/1987 | Iden et al. | 546/37 |
| 4,709,029 | 11/1987 | Spietschka et al. | 546/37 |
| 4,831,140 | 5/1989 | Spietschka et al. | 546/37 |
| 4,846,892 | 7/1989 | Henning et al. | 546/37 |
| 5,123,966 | 6/1992 | Dietz et al. | 546/37 |

FOREIGN PATENT DOCUMENTS

| | | |
|---|---|---|
| 1570579 | 6/1969 | France . |
| 3703513 | 8/1988 | Germany . |

*Primary Examiner*—Gary L. Geist
*Assistant Examiner*—Catherine S. Kilby Scalzo
*Attorney, Agent, or Firm*—Connolly & Hutz

[57] ABSTRACT

Novel perylene compounds based on perylene-3,4,9,10-tetracarboxylic acid monoanhydride monoimides which are substituted by alkylene- or arylenesulfonic acid groups on one or both imide nitrogen atoms, or on corresponding tetracarboxylic acid diimides, or on a halogenation product thereof, have properties which render them accessible, in addition to their use as dispersing agent for pigments of the same class of compound or other categories, also for direct use as pigments and fluorescent dyestuffs as well as polymer-soluble dyestuffs.

15 Claims, No Drawings

PERYLENE COMPOUNDS CONTAINING SULFONIC ACID GROUPS PROCESS FOR PREPARING THEM AND THEIR USE

The present invention relates to novel, useful perylene compounds which contain sulfonic acid groups and correspond to the general formula I

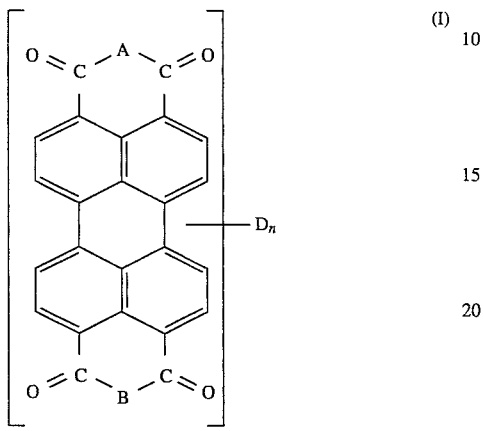

and in which

A is a bivalent radical —O—, >NR$^1$ or >N—R$^2$—SO$_3^-$X$^+$ and

B is the bivalent radical >N—R$^2$—SO$_3^-$X$^+$,

D is a chlorine or bromine atom and, if n>1, optionally a combination thereof, and n is a number from 0 to 8;

in which, in the above radicals A and B,

R$^1$ is a hydrogen atom or a C$_1$–C$_{30}$-alkyl group, preferably C$_1$–C$_{18}$-alkyl and in particular C$_1$–C$_4$-alkyl, or an aryl group, preferably phenyl, which can be unsubstituted or mono- or polysubstituted by halogen, such as chlorine or bromine, sulfo, C$_1$–C$_4$-alkyl, such as methyl or ethyl, C$_1$–C$_4$-alkoxy, such as methoxy or ethoxy, or phenylazo, R$^2$ is a straight-chain or branched C$_1$–C$_6$-alkylene group, in particular ethylene or propylene, and X$^+$ is the hydrogen ion H$^+$ or the equivalent M$^{m+}$/m of a metal cation from main group 1 to 5 or from subgroup 1 or 2 or 4 to 8 of the periodic system of the chemical elements, in which m is one of the numbers 1, 2 or 3, such as, for example, Li$^{1+}$, Na$^{1+}$, K$^{1+}$, Mg$^{2+}$, Ca$^{2+}$, Sr$^{2+}$, Ba$^{2+}$, Mn$^{2+}$, Cu$^{2+}$, Ni$^{2+}$, Cd$^{2+}$, Co$^{2+}$, Zn$^{2+}$, Fe$^{2+}$, Al$^{3+}$, Cr$^{3+}$, or Fe$^{3+}$; or an ammonia ion N$^+$R$^3$R$^4$R$^5$R$^6$, in which the substituents R$^3$, R$^4$, R$^5$ and R$^6$ on the quaternary N atom independently of one another are each a hydrogen atom or a group from the series comprising C$_1$–C$_{30}$-alkyl, C$_1$–C$_{30}$-alkenyl and C$_1$–C$_{30}$-cycloalkyl, unsubstituted or by [sic] C$_1$–C$_8$-alkylated phenyl or a (poly)alkyleneoxy group

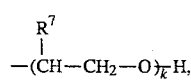

in which R$^7$ is hydrogen or C$_1$–C$_4$-alkyl and k is a number from 1 to 30, and in which alkyl, alkenyl, cycloalkyl, phenyl or alkylphenyl identified as R$^3$, R$^4$, R$^5$ and/or R$^6$ can moreover optionally be substituted by amino, hydroxyl and/or carboxyl; or in which the substituents R$^3$ and R$^4$, together with the quaternary N atom, can form a five- to seven-membered saturated ring system, which optionally also contains further hetero atoms, such as an O, S and/or N atom, for example of the pyrrolidone, imidazolidine, hexamethyleneimine, piperidine, piperazine or morpholine type; or in which the substituents R$^3$, R$^4$ and R$^5$, together with the quaternary N atom, c an form a five- to seven-membered aromatic ring system, which Optionally also contains further hetero atoms, such as an O, S and/or N atom, and onto which additional rings are optionally fused, for example of the pyrrole, imidazole, pyridine, picoline, pyrazine, quinoline or isoquinoline type.

Compounds of the general formula I which have found particular interest according to the invention are, those in which A and B are identical and are each the bivalent radical >N—R$^2$—SO$_3^-$X$^+$ and D and n are as defined above, in which, in the above radicals A and B, R$^2$ has the meaning given above and X$^+$ is the hydrogen ion H$^+$ or the equivalent M$^{m+}$/m of a metal cation of the chemical elements described individually above, or an ammonium ion N$^+$R$^3$R$^4$R$^5$R$^6$, in which the substituents R$^3$, R$^4$ and R$^5$ on the quaternary N atom independently of one another are each a hydrogen atom or the group C$_2$–C$_3$-hydroxyalkyl, and R$^6$ is one of the groups from the series comprising C$_1$–C$_{30}$-alkyl, C$_1$–C$_{30}$-alkenyl, C$_2$–C$_3$-hydroxyalkyl and C$_5$–C$_6$-cycloalkyl.

Perylene compounds of the general formula I which contain sulfonic acid groups and are classified as exceptionally useful according to the invention are those in which A is a bivalent radical —O—, >NR$^1$ or >N—CH$_2$—CH$_2$—SO$_3^-$X$^+$ and B is the bivalent radical >N—CH$_2$—CH$_2$—SO$_3^-$X$^+$ and n is the number 0 in which, in the above radicals A and B,

R$^1$ has the meaning given above and

X$^+$ is the cation H$^+$ or Ca$^{2+}$/2 or an ammonium ion N$^+$H$_3$R$^6$, in which R$^6$ is to be considered as being of the type described immediately above.

The invention in question also relates to a process for the preparation of the above-described perylene compounds containing sulfonic acid groups and having the chemical structure according to formula I. These novel compounds can be obtained by reacting perylene-3,4,9,10-tetracarboxylic acid monoanhydride mono-alkali metal salts, in particular the monopotassium salt, perylene-3,4,9,10-tetracarboxylic acid monoanhydride monoimide, N-monoalkyl- or N-monoarylimides or perylene-3,4,9,10-tetracarboxylic acid dianhydride with primary aliphatic amines containing sulfonic acid groups, of the general formula II $$H_2N—R^2—SO_3^-X^+ \qquad (II)$$

in which R$^2$ and X have the meaning given above, for example aminoalkanesulfonic acids or salts thereof, such as, in particular, taurine (2-aminoethanesulfonic acid), the condensation of the starting substances being carried out in aqueous solution, preferably under alkaline pH conditions, at temperatures in the range between 50° C. and 180° C. The amines of the formula II are advantageously employed in excess in this reaction. The process products of the formula I formed are isolated from the reaction mixture by filtration of their salts, which can then be converted into the corresponding free sulfonic acids by treatment with strong mineral acids, such as sulfuric acid.

Instead of in an aqueous medium, the condensation of the two reaction partners can also be carried out in high-boiling, inert organic solvents, such as, for example, quinoline, imidazole, naphthalene, -chloronaphthalene [sic], trichlorobenzene or phenol, at temperatures >100° C., preferably in the range between 180° and 230° C., if appropriate in the presence of known catalysts (reaction accelerators), such as sulfuric acid, phosphoric acid or zinc salts. According to this modified possible synthesis, the perylene compounds of the formula I which contain sulfonic acid groups and are formed as salts are advantageously filtered off from the reaction mixture at higher temperatures, such as in the range from 80° to 120° C., if appropriate after prior dilution thereof with inert organic solvents, for example aliphatic alcohols or aliphatic ketones. If desired, the sulfonate which has been separated off can then be converted into the free acid form in the customary manner by hydrolysis.

If the production of perylene compounds of the formula I which are unsymmetrically substituted on the two imide nitrogen atoms is intended according to the invention, this is effected utilizing the different reactivity of derivatives of the tetraacids of the perylene type used as the starting material, which derivatives differ in structure in respect of the two adjacent acid pairs, if appropriate by stepwise reaction with the amines of the formula II containing sulfonic acid groups, taking into particular consideration the amount thereof used and the reaction conditions, or such a process takes place by reaction of primary aliphatic or aromatic amines $R^1$—$NH_2$ with perylenetetracarboxylic acid monoanhydride monoimides of the formula I which already contain sulfonic acid alkylene groups —$R^2$—$SO_3^-X^+$ unilaterally on the imide nitrogen present.

Halogenated perylene compounds of the formula I containing sulfonic acid groups, where n>0, are obtainable by condensation of corresponding halogenation products (n>0) of the perylenetetracarboxylic acid derivatives mentioned above as starting compounds with amines of the formula II containing sulfonic acid groups, or by subsequent halogenation of already prepared but halogen-free (n=0) process products of the formula I.

The salts of the perylene compounds of the formula I containing sulfonic acid groups, where $X^+ \neq H^+$, are already obtained—as explained above—in the synthesis, or—if a certain cation $X^+$ is considered—are prepared separately by targeted treatment of the free sulfonic acids ($X^+=H^+$) with metal salts or amines in accordance with the meaning of $X^+$ in this respect, preferably in aqueous solution.

The properties of the perylene compounds of the formula I claimed, which contain one or two anionic sulfonic acid/sulfonate groups —$R^2$—$SO_3^-X^+$, can be controlled within wide limits by specific choice both of a substituent $R^1$ optionally present on the other imide nitrogen or of the number n of halogen atoms D on the polycyclic system, as well as by that of the cation $X^+$. The profile of properties required for the particular intended use of these novel compounds must be established by orientating experiments and optimized in a targeted manner. Depending on the nature of the substituent and the cation, compounds which are soluble in water and polar organic solvents, in non-polar organic solvents or plastics thus result. The compatibility of the process products in the media in question can be additionally influenced by introduction of hydrophobic or hydrophilic substituents or cations. Hydrophobic amine radicals (long-chain alkylene groups) in general promote the solubility in organic solvents and plastics. Hydrophilic amines or water-soluble amines promote the solubility in aqueous or polar systems.

According to the invention, it is also possible, by corresponding variation of the cation, to arrive at very sparingly soluble compounds of the formula I which, because of this property, can already be used in themselves as pigments. Such circumstances apply to mono- and in particular di- or polyvalent metal cations.

The sulfonated perylene compounds of the formula I according to the invention have proven to be useful coloring agents. Depending on the nature of the substituent and cation, they can be considered as pigments, pigment dispersers or fluorescent dyestuffs for this purpose. The halogenated, sulfonated perylene compounds of this type are equally soluble in aqueous and in organic media as free sulfonic acids and in the form of their salts. They are distinguished by the high fluorescence intensities which can thereby be achieved and good fastness properties and are therefore useful for use as fluorescent dyestuffs for dyeing aqueous or aqueous-organic media and liquid or solid organic substances.

The perylene compounds according to the invention are suitable in this way for utilization in light collection systems and can be used in analytical detection methods, in colored liquid crystal displays, for the production of cold light sources, for materials testing and for investigating microstructures of semiconductor components, as well as for marking and information purposes.

Liquid organic substances which can be dyed using such fluorescent dyestuffs are, for example, alcohols, ketones, halohydrocarbons, ethers, esters, aromatic and aliphatic hydrocarbons, nitriles, amines, nitro compounds, amides or mixtures thereof with one another, and mixtures of these solvents with binders.

Solid organic substances which can be dyed with such fluorescent dyestuffs are synthetic resins and plastics, such as, for example, amino resins, in particular urea- and melamine-formaldehyde resins, alkyd resins, acrylic resins, phenolic resins, polycarbonates, polyolefins, such as polystyrene, polyvinyl chloride, polyethylene and polypropylene, polyacrylonitrile, polyacrylic acid esters, polyamides, polyurethanes or polyesters, which can be used in bulk by themselves or in the form of mixtures or copolymers.

The readily soluble and the sparingly soluble sulfonated perylene compounds are furthermore, under the influence of their anionic character, highly active dispersing agents for the preparation of pigment formulations. Preparations of this class have outstanding coloristic and rheological properties.

The alkaline earth metal salts, the heavy metal salts and the amine salts of the sulfonic acids of the perylene type are suitable directly for utilization as pigments, because of their sparing solubility. They exhibit very good coloristic and rheological properties.

The pigment formulations produced by mixing the readily soluble or the sparingly soluble sulfonated perylene compounds according to the formula I, as a dispersing agent, with base pigments of the same or different chemical origin, for example from the class of azo, quinacridone and above all perylene compounds, and the alkaline earth metal salts, heavy metal salts and amine salts of the sulfonic acids, which are suitable for use as pigments by themselves because of their sparing solubility, can be employed in an outstanding manner for pigmenting (coloring) high molecular weight organic materials of natural or synthetic origin.

High molecular weight organic materials which can be colored with the perylene compounds of the formula I claimed, which contain sulfonic acid groups, or with pigment formulations prepared on the basis of products of this type are, for example, cellulose ethers and esters, such as ethylcellulose, nitrocellulose, cellulose acetate and cellulose butyrate, naturally occurring resins or synthetic resins, such as polymerization resins or condensation resins, for example amino resins, in particular urea- and melamine-formaldehyde resins, alkyd resins, acrylic resins and phenolic resins, polycarbonates, polyolefins, such as polystyrene, polyvinyl chloride, polyethylene and polypropylene, polyacrylonitrile, polyacryic [sic] acid esters, polyamides, polyurethanes or polyesters, rubber, casein, silicone and silicone resins, individually or in mixtures.

It is irrelevant here whether the high molecular weight organic compounds mentioned are in the form of plastic compositions or melts or in the form of spinning solutions, varnishes, paints or printing inks. Depending on the intended use, it proves to be advantageous to employ the perylene compounds according to the invention or the pigment formulations produced with their participation as toners or in the form of preparations or dispersions. The perylene compounds claimed or pigment formulations derived therefrom are employed in an amount of preferably 1 to 10% by weight, based on the high molecular weight organic material to be pigmented.

Particularly preferred varnish systems in this respect are stoving varnishes from the alkyd/melamine resin or acrylic/melamine resin varnish class, and two-component varnishes based on acrylic resins which can be crosslinked with polyisocyanate. Of the large number of pigmentable printing inks, printing inks based on nitrocellulose are to be mentioned in particular.

The perylene compounds according to the invention or pigment formulations resulting with their participation are dispersible readily and up to high degrees of fineness in many use media. These dispersions have a high flocculation stability and exhibit outstanding rheological properties, even in cases of high pigmentation. Varnishings and prints of good depth of color, high gloss and high transparency and with outstanding fastness properties can be produced with them.

The perylene compounds according to the invention or pigment formulations based on these are also outstandingly suitable as polymer-soluble coloring agents for coloring deformable plastics, in particular polyvinyl chloride, polyethylene and polypropylene. Dyeings of good depth of color and very good dispersibility are obtained.

To evaluate the properties of the products according to formula I claimed or pigment formulations produced in combination with these in varnish systems, of the large number of known systems, an alkyd/melamine resin varnish (AM6) based on a medium-oil non-drying alkyd resin of synthetic fatty acids and phthalic anhydride and a melamine resin etherified with butanol and contents of a non-drying alkyd resin based on ricinenic acid (short oil) and an acrylic resin storing varnish based on a non-aqueous dispersion (TSA-NAD) were chosen. In the following examples, these are referred to by the designation AM6 and TSA-NAD.

The rheology of the ground material after the dispersion (millbase rheology) is evaluated by the following five-point scale:

| 5 | thinly liquid | 2 | slightly gelled |
| 4 | liquid | 1 | gelled |
| 3 | viscous | | |

After dilution of the ground material to the final pigment concentration, the viscosity was evaluated with a Rossmann type 301 viscocity spatula from Erichsen.

The gloss measurements were carried out on cast films under an angle of 20° in accordance with DIN 67350 (ASTMD 523) using the "multigloss" gloss meter from Byk-Mallinckrodt.

The tests in polyvinyl chloride (PVC) were carried out at 120° C. and 160° C.

In the examples which follow, parts in each case relate to parts by weight and percentages in each case relate to percentages by weight of the substances thus described. The class designations used for identification for pigments employed according to the invention and C.I. numbers directed to these are to be found in the COLOUR INDEX, 3rd Edition 1971 and Supplements 1975, 1982 and 1987.

Example 1

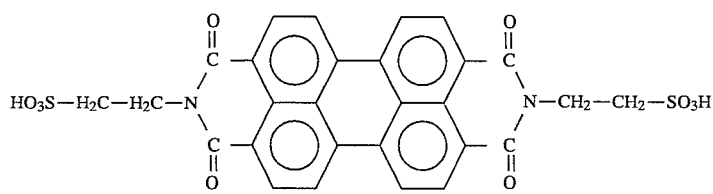

(III)

39.2 g of perylene-3,4,9,10-tetracarboxylic acid dianhydride are suspended in 1200 ml of water in an autoclave. 50 g of taurine and 26.4 g of potassium hydroxide (85% strength) are added to this suspension, after which the mixture is stirred at 150° C. for 5 hours. After cooling to 25° C., the reaction product which has precipitated is filtered off with suction, washed neutral with water and dried at 80° C.

For conversion into the acid form, the compound of the formula III isolated in this way as the dipotassium salt is now first introduced into 1400 g of 100% strength sulfuric acid at 25° C. and dissolved. 930 g of 50% strength sulfuric acid are then also added dropwise to this solution, during which the temperature may rise to 80° C. The mixture is then allowed to cool to 25° C.; the sulfonic acid liberated is then filtered off with suction over a glass frit, rinsed with 80% strength sulfuric acid, washed free from sulfate by treatment with 31% strength hydrochloric acid and dried in vacuo at 80° C.

Yield: 59.0 g of a compound of the abovementioned formula III, which contains 6.2% of water of crystallization, corresponding to 55.3 g of 100% pure compound (=91.3% of theory).

Analysis: $C_{28}H_{18}N_2S_2O_{10}$ taking into account 6.2% of $H_2O$ Calculated: C 55.4%; H 3.0%; N 4.6%; S 10.6% Found: C 55.5%; H 2.8%; N 4.7%; S 10.1% $^1$H-NMR spectrum in $D_2SO_4$ Shift position ($^1$H) (doublet 8.77; 8.70); 4.68; 3.64

Example 1a 19.2 g of C.I. Pigment Red 179 (No. 71130) of the perylene type, prepared analogously to the process described in Example 1 of EP-PS 0,088,392 without addition of surface-active agents, are mixed with 0.8 g of perylene compound of the formula III as a pigment disperser. A pigment formulation which produces transparent, light-colored pure varnish coatings with a good depth of color and high gloss is obtained on testing in the TSA-NAD varnish. The metallic varnishings have a good depth of color and are very pure. The millbase rheology of the product (15% strength) is evaluated with rating 5. Without admixing the pigment disperser, on the other hand, the colorations produced with the coloring agent are more opaque and less deep in color. In this case, the millbase rheology is given the rating 1.

Example 1b 17.6 g of C.I. Pigment Red 179 (No. 71130) of the perylene type, prepared analogously to the instructions of Example 1 of EP-PS 0,088,392, without addition of surface-active agents, are mixed with 2.4 g of perylene compound of the formula III as a pigment disperser. A pigment formulation which produces transparent, light-colored pure varnishings which have a good depth of color and high gloss is obtained on testing in the TSA-NAD varnish. The depth of color and gloss of these varnishings are higher than in the case of the varnishings prepared according to Example 1a. The metallic varnishings have a good depth of color and are very pure. The millbase rheology of the product (15% strength) is given a rating of 4–5 in this case. Without admixing the pigment disperser, on the other hand, the colorations produced with the coloring agent are more opaque and less deep in color. In this case, the millbase rheology (15% strength) is given the rating 1.

Example 1c 10 g of perylene compound of the formula III are introduced into 150 ml of water and dissolved. A solution of 10 g of ethanol and 1 g of oleic acid monoethanolamide is then added and the mixture is brought to the boiling point with heating. A solution of 10 g of calcium chloride (anhydrous) and 200 ml of water is now furthermore added dropwise at the boiling point in the course of 10 minutes. After the mixture has been stirred at the boiling point for a further 3 hours, the reaction product which has separated out is filtered off with suction, washed free from chloride by means of water and dried at 80° C. 10.8 g of a pigment (as the Ca salt) which gives transparent, maroon-colored varnishings of high gloss in the TSA-NAD varnish are obtained. The millbase rheology of the product (15% strength) is given the rating 5.

Example 1d 10 g of perylene compound of the formula III are introduced into 150 ml of water and dissolved. A solution of 20 g of ethanol and 2 g of oleic acid monoethanolamine is then added and the mixture is brought to the boiling point with heating. A solution of 10 g of nickel sulfate hexahydrate and 200 ml of water is now furthermore added dropwise at the boiling point in the course of 10 minutes. After the mixture has been stirred at the boiling point for a further 3 hours, the reaction product which has separated out is filtered off with suction, washed free from chloride by means of water and dried at 80° C. 12.7 g of a pigment (as the Ni salt) which gives transparent, maroon-colored varnishings of high gloss in the TSA-NAD varnish are obtained. The millbase rheology of the product (15% strength) is given the rating 5.

Example 1e 15 g of perylene compound of the formula III are introduced into 150 ml of water and dissolved. A solution of 15.5 g of abiethylamine [sic] and 50 ml of ethanol is now added dropwise at the boiling point in the course of 15 minutes. After the mixture has been stirred at the boiling point for a further hour, the reaction product which has separated out is filtered off with suction, washed with water and dried at 80° C.

28.6 g of a pigment (as the abietylammonium salt) which gives highly transparent, scarlet-colored varnishings of high gloss in the TSA-NAD varnish are obtained. The millbase rheology of the product (15% strength) is given a rating of 5. The fastness to over-varnishing is perfect.

Example 1f 30 g of perylene-3,4,9,10-tetracarboxylic acid N,N'-bis-(3',5'-dimethylphenylimide), prepared as the crude pigment as described in Example 1 of DE-B 1,067,157, are introduced into a 1.4 liter stainless steel container filled with 1400 g of porcelain beads (12mm diameter) as the grinding bodies, and are used as the initial reaction material. 90 g of sodium sulfate (anhydrous), 0.7 g of stearylamine and 0.75 g of perylene compound of the formula III as a pigment disperser are moreover also added to the mixture, and the mixture is now finely ground for 8 hours by shaking on a vibratory mill (®Vibratom type; manufacturer: Siebtechnik Mühlheim). The grinding bodies are then sieved off from the resulting ground material and the product is extracted by stirring at 90° C. for 1 hour, under treatment with hot water. The process product is then filtered off with suction, washed free from sulfate with the aid of water and dried at 80° C. 28.9 g of a pigment formulation based on C.I. Pigment Red 149 (No. 71137) of the perylene type are obtained. On testing the product in PVC, transparent, light-colored, deep, pure colorations of perfect fastness to bleeding are achieved. The pigment prepared without addition of the dispersing agent of the formula III, on the other hand, gives more opaque, darker and bluer colorations in PVC.

Example 1g 30 g of perylene-3,4,9,10-tetracarboxylic acid diimide with a bromine content of 25.45%, prepared analogously to the instructions of Example 9 of EP-PS 0,039,912, are introduced into a 1 liter plastic vessel filled with 1400 g of Cylpebs (of corundum, 12 mm diameter; manufacturer: Groh GmbH, Hof) as grinding bodies, and are used as the initial reaction material. 3 g of perylene compound of the formula III as a pigment disperser and 3 g of stearylamine are furthermore also added to the mixture in succession. This mixture is then finely ground for 12 hours by shaking on a vibratory mill (as in Example 1f), after which the ground material is isolated by sieving off the grinding bodies. 31 g of the above ground material are now introduced into 340 ml of N-methylpyrrolidone, and the mixture is heated to 50° C. and subsequently stirred at this temperature for 3 hours. 200 ml of water are then added and the reaction product is filtered off with suction, washed free from N-methylpyrrolidone by treatment with water and dried at 80° C. 29.5 g of a pigment formulation based on brominated perylene-3,4,9,10-tetracarboxylic acid diimide are obtained. On coloring with the product in the: TSA-NAD varnish, transparent, light-colored, deep and pure varnishings result. Without addition of the dispersing agent of the formula III, in contrast, the varnishings with the pigment are opaque, dark and weak in color. The rheological properties are approximately comparable in these two cases. Very transparent, deep and pure colorations are obtained with the above formulation in nitrocellulose gravure printing. Without the addition of the dispersing agent of the formula III, the colorations with the product are more opaque, less deep in color, bluer and cloudier.

Example 2

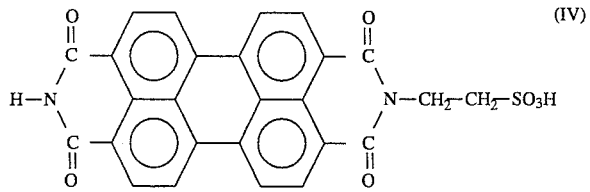

1200 ml of water are initially introduced into an autoclave and 37.6 g of taurine are dissolved in this. A pH of 9.5 is established in this solution by further addition of 12.6 g of potassium hydroxide (85% strength). 39.1 g of perylene-3,4,9,10-tetracarboxylic acid monoanhydride monoimide are then introduced into the initial mixture and the mixture is stirred at 150° C. for 3 hours. After cooling to 25° C., the reaction product formed as the K salt is filtered off with suction, washed neutral with saturated potassium chloride solution and dried at 80° C.

The resulting residue is now initially introduced into 1300 g of 100% strength sulfuric acid at 25° C. and dissolved. 1070 g of 50% strength sulfuric acid are then also added dropwise to this solution, during which the temperature may rise to 80° C. The mixture is then allowed to cool to 25° C.; the sulfonic acid liberated in this way is filtered off with suction over a glass frit, rinsed with 78% strength sulfuric acid, washed free from sulfate by treatment with 31% strength hydrochloric acid and dried in vacuo at 80° C.

Yield: 38.4 g of a compound of the abovementioned formula IV, which contains 4.6% of water of crystallization, corresponding to 36.6 g of 100% pure compound (=73.5% of theory).

Analysis: $C_{26}H_{14}N_2SO_7$ taking into account 4.6% of $H_2O$
Calculated: C 62.7%; H 2.8%; N 5.6%; S 6.4% Found: C 63.3%; H 2.6%; N 5.7%; S 6.1%

Example 3

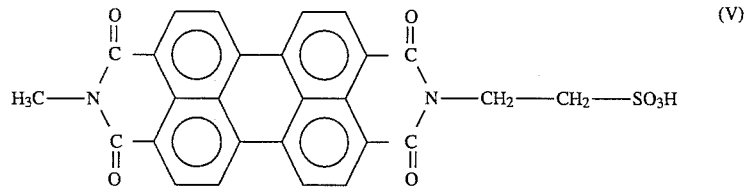

1200 ml of water are initially introduced into an autoclave and 50.1 g of taurine are dissolved therein. A pH of 9.6 is established in this solution by further addition of 26.4 g of potassium hydroxide (85% strength). 40.5 g of perylene-3,4,9,10-tetracarboxylic acid monoanhydride N-monomethylimide are then introduced into the initial mixture and the mixture is then subsequently stirred at 150° C. for 3 hours. After cooling to 25° C., the reaction product formed as the K salt is filtered off with suction, rinsed with water and dried at 80° C. The resulting residue is now initially introduced into 1000 g of 100% strength sulfuric acid at 25° C. at dissolved. 850 g of 50% strength sulfuric acid are then also added dropwise to this solution, during which the temperature may rise to 80° C. The mixture is then allowed to cool to 25° C.; the sulfonic acid liberated in this way is filtered off with suction over a glass frit, rinsed with 78% strength sulfuric acid, washed free from sulfate by treatment with 31% strength hydrochloric acid and dried in vacuo at 80° C.

Yield: 44.9 g of a compound of the abovementioned formula V, which contains 1.9% of water of crystallization, corresponding to 44.0 g of 100% pure compound (=85.9% of theory).

Analysis: $C_{27}H_{16}N_2SO_7$ taking into account 1.9% of $H_2O$
Calculated: C 63.3%; H 3.1%; N 5.5%; S 6.3% Found: C 63.0%; H 3.4%; N 5.4%; S 6.3%

Examples 3a to 3j

The perylene compound of the formula V was added in a number of cases as a pigment disperser in various amounts to various pigments, the components were mixed mechanically and the pigment formulations obtained by this process were then tested against the particular base pigment in the TSA-NAD varnish or AM6 varnish. The technological results achieved here are listed in the following compilation:

| Example | Base pigment | Amount added | Varnish system | Gloss cast | Millbase rheology | Full shade | Brightening |
|---|---|---|---|---|---|---|---|
| 3a | C.I. Pigment Red 179 (No. 71130) perylene type prepared according to EP-PS 0,088,392 | none 5% 10% | TSA/NAD TSA/NAD TSA/NAD | 95 99 100 | 1 4–5 5 | about the same noticeably more transparent | somewhat deeper in color noticeably deeper in color |
| 3b | C.I. Pigment Red 179 (No. 71130) perylene type prepared according to EP-PS 0,318,022 | none 5% | TSA/NAD TSA/NAD | 85 86 | 5 5 | less transparent | somewhat deeper in color |
| 3c | C.I. Pigment Red 179 (No. 71130) perylene type prepared according to EP-PS 0,318,022 | none 5% | AM6 AM6 | 89 89 | 4–5 5 | less transparent | somewhat deeper in color |
| 3d | C.I. Pigment Red 224 (No. 71127) perylene type | none 5% | TSA/NAD TSA/NAD | 89 99 | 5 5 | noticeably more transparent, noticeably darker | noticeably deeper in color |
| 3e | C.I. Pigment Red 149 (No. 71137) perylene type | none 5% | TSA/NAD TSA/NAD | 35 63 | 3 2 | noticeably more transparent noticeably darker | noticeably deeper in ably color |
| 3f | C.I. (No.73915) Pigment Red 122 quinacridone type prepared according to EP-PS 0,318,022 | none 5% | TSA/NAD TSA/NAD | 13 89 | 3 5 | distinctly more transparent, noticeably darker | distinctly deeper in color |
| 3g | C.I. Pigment Violet 19 (No. 73900) quinacridone type | none 5% | TSA/NAD TSA/NAD | 74 74 | 4–5 5 | noticeably more transparent, somewhat darker | noticeably deeper in color |
| 3h | C.I. Pigment Red 187 (No. 12486) naphthol AS type | none 10% | TSA/NAD TSA/NAD | 23 94 | 4–5 5 | noticeably more transparent, noticeably darker | distinctly deeper in color |
| 3i | C.I. Pigment Violet 32 (No. 12517) benzimidazolone type | none 10% | TSA/NAD TSA/NAD | 62 78 | 4–5 5 | somewhat more transparent, somewhat darker | distinctly deeper in color |
| 3j | C.I. Pigment Red 171 (No. 12512) benzimidazolone type | none 10% | TSA/NAD TSA/NAD | 79 86 | 4 5 | noticeably more transparent, somewhat lighter | distinctly deeper in color |

Example 4

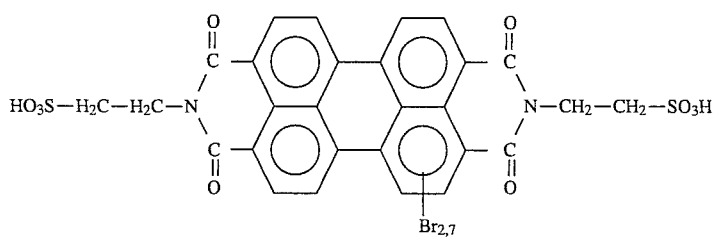

(VI)

15.2 g of perylene-3,4,9,10-tetracarboxylic acid N,N'-bis(2'-sulfoethylimide) of the formula III (93.8% pure), prepared according to Example 1, are introduced into 450 g of 100% strength sulfuric acid at 25° C., while stirring, and dissolved. 6.0 g of bromine and 0.2 g of iodine are then added to this solution. The bromination mixture is then subsequently stirred at 125° C. for a further 6 hours and is now allowed to cool to 25° C., and 500 g of 30% strength sulfuric acid are added dropwise at this temperature. The reaction product which precipitates out during this procedure is filtered off with suction over a glass frit, rinsed with 60% strength sulfuric acid, washed free from sulfate by treatment with 31% strength hydrochloric acid and dried at 80° C. in vacuo.

Yield: 17.7 g of a compound of the abovementioned formula VI, which contains 4.5% of water of crystallization, corresponding to 16.9 g of 100% pure compound (=87.8% of theory).

Analysis: $C_{28}H_{15.3}N_2S_2O_{10}Br_{2.7}$ taking into account 4.5% of $H_2O$ Calculated: C 40.7%; H 1.9%; N 3.3%; Br 26.4%; S6.8% Found: C 41.0%; H 1.9%; N 3.4%; Br 26.3%; S7.8%

On testing the product by tub coloring of paper, red, deep colorations are obtained. The colorations in the nitrocellulose varnish are red, deep and fluorescent.

Example 5

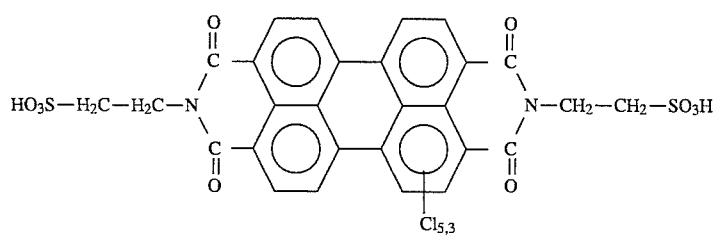

(VII)

31.4 g of perylene-3,4,9,10-tetracarboxylic acid N,N'-bis(2'-sulfoethylimide) of the formula III (93.8% pure), prepared according to Example 1, are introduced into 402 g of 100% strength sulfuric acid, while stirring, and dissolved. After 0.6 g of sodium iodide has been added to this solution, 70 g of chlorine are now passed in at 20°–25° C. in the course of 12 hours, a further 0.6 g of sodium iodide additionally being added at intervals of 3 hours. 560 g of 20% strength sulfuric acid are then also added dropwise to the chlorination mixture at 20°–25° C. The reaction product which has precipitated during this procedure is filtered off with suction over a glass frit, rinsed with 50% strength sulfuric acid, washed free from sulfate by treatment with 31% strength hydrochloric acid and dried at 80° C. in a vacuum drying cabinet.

Yield: 34.3 g of a compound of the abovementioned formula VII, which contains 3.0% of water of crystallization, corresponding to 33.3 g of 100% pure compound (=86.8% of theory).

Analysis: $C_{28}H_{12.7}N_2S_2O_{10}Cl_{5.3}$ taking into account 3.0% of $H_2O$ Calculated: C 42.6%; H 1.6%; N 3.6%; Cl 23.9%; S 8.1% Found: C 42.4%; H 2.3%; N 3.1%; Cl 23.9%; S7.9%

On testing the product by tub dyeing of paper, orange, deep colorations are obtained. The colorations in the nitrocellulose varnish are orange, deep and fluorescent.

Example 6

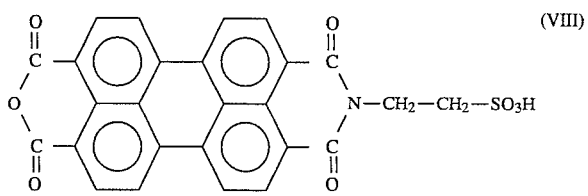

(VIII)

1200 ml of water are initially introduced into a stirred vessel, and 101 g of taurine and 52.8 g of potassium hydroxide (85% strength) are dissolved therein. The solution prepared is cooled to 0°–5° C., and 90.1 g of perylene-3,4,9,10-tetracarboxylic acid monoanhydride monopotassium salt are introduced at this temperature, after which the mixture is subsequently stirred first at 20°–25° C. for 2 hours and then at 90°–95° C. for a further 3 hours. The reaction mixture is then allowed to cool to 20°–25° C. and filtered with suction and the residue on the filter is rinsed with 100 ml of water. 125 g of methanol and 300 g of potassium acetate (anhydrous) are now added to the resulting filtrate, and the liquid is then stirred at 20°–25° C. for 2 hours. The reaction product which has precipitated during this procedure is filtered off with suction, rinsed with an aqueous-methanolic solution of 18% of potassium acetate and 6% of methanol and dried at 80° C.

The compound of the formula VIII isolated as the tripotassium salt is now initially introduced into 1230 g of sulfuric acid monohydrate at 20°–25° C. and dissolved. 820 g of 50% strength sulfuric acid are then also added dropwise to this solution, during which the temperature may rise to 80° C. After the mixture has first been cooled to 25° C., the sulfonic acid thus liberated is filtered off with suction over a glass frit, rinsed with 80% strength sulfuric acid, washed free from sulfate by treatment with 31% strength hydrochloric acid and dried in vacuo at 80° C.

Yield: 71.2 g of a compound of the abovementioned formula VIII, which contains 6.1% of water of crystallization, corresponding to 66.9 g of 100% pure compound (=66.7% of theory).

Analysis: $C_{26}H_{13}NSO_8$ taking into account 6.1% of $H_2O$ Calculated: C 62.5%; H 2.6%; N 2.8%; S 6.4% Found: C 63.2%; H 2.6%; N 2.8%; S 6.3%

Example 7

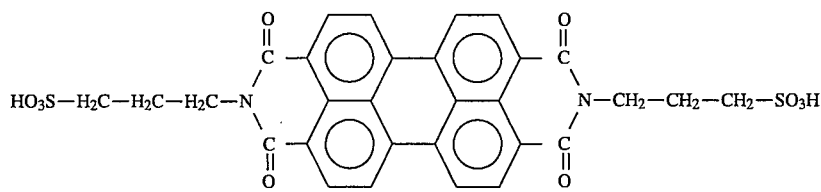

9.8 g of perylene-3,4,9,10-tetracarboxylic acid dianhydride are suspended in 290 ml of water in an autoclave. 13.9 g of 3-aminopropanesulfonic acid and 6.6 g of potassium hydroxide (85% strength) are added to this suspension, after which the mixture is stirred at 150° C. for 5 hours. After cooling to 25° C., 50 g of potassium chloride are also introduced and the reaction product which has precipitated out is filtered off with suction, washed neutral with 20% strength potassium chloride solution and dried at 80° C.

For conversion into the acid form, the compound of the formula IX isolated in this way as the dipotassium salt is now initially introduced into 300 g of 100% strength sulfuric acid at 25° C. and dissolved. 200 g of 50% strength sulfuric acid are then also added dropwise to this solution, during which the temperature may rise to 80° C. The mixture is then allowed to cool to 25° C. and the sulfonic acid liberated is then filtered off with suction over a glass frit, rinsed with 80% strength sulfuric acid, washed free from sulfate by treatment with 31% strength hydrochloric acid and dried at 80° C. in vacuo.

Yield: 14.9 g of a compound of the abovementioned formula IX, which contains 5.4% of water of crystallization, corresponding to 14.1 g of 100% pure compound (=89.0% of theory).

Analysis: $C_{30}H_{22}N_2S_2O_{10}$ taking into account 5.4% of $H_2O$ Calculated: C 56.8%; H 3.5%; N 4.4%; S 10.1% Found: C 56.9%; H 3.5%; N 4.2%; S 9.9%

Example 8

50 ml of quinoline are initially introduced into a stirred vessel, and 4.99 g of perylene-3,4,9,10-tetracarboxylic acid monoanhydride N-mono(2'-sulfoethylimide) of the formula VIII (93.9% pure), prepared according to Example 6, as well as 4.92 g of 4-methoxyaniline and 0.5 g of zinc acetate dihydrate are then introduced in succession. The mixture is then heated to 190° C. and stirred at this temperature for 8 hours. It is then allowed to cool to 120° C. and the reaction product which has precipitated out as the Zn salt is filtered off with suction at this temperature, rinsed with quinoline and methanol and dried at 80° C. The dry residue is now introduced into 65 g of 50% strength sulfuric acid at 25° C. and the mixture is then subsequently stirred at 25° C. for 5 hours. The sulfonic acid liberated in this manner is finally filtered off with suction over a glass frit, washed free from sulfate by treatment with 31% strength hydrochloric acid and dried at 80° C. in vacuo.

Yield: 5.79 g of a compound of the abovementioned formula X, which contains 4.3% of water of crystallization, corresponding to 5.54 g of 100% pure compound (=97.9% of theory).

Analysis: $C_{33}H_{20}N_2SO_8$ taking into account 4.3% of $H_2O$ Calculated: C 65.6%; H 3.3%; N 4.6%; S 5.3% Found: C 64.9%; H 3.2%; N 4.6%; S 5.3%

Example 9

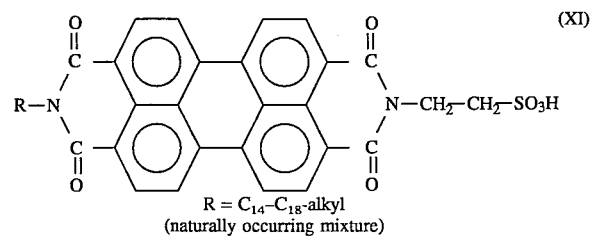

50 ml of quinoline are initially introduced into a stirred vessel, and 4.99 g of perylene-3,4,9,10-tetracarboxylic acid monoanhydride N-mono(2'-sulfoethylimide) of the formula VIII (93.9% pure), prepared according to Example 6, and 21.6 g of a $C_{14}$-$C_{18}$-alkylamine (naturally occurring mixture) and 0.5 g of zinc acetate dihydrate are then introduced in succession. The mixture is then heated to 190° C. and stirred at this temperature for 8 hours. It is is then allowed to cool to 120° C. and the reaction product which has formed

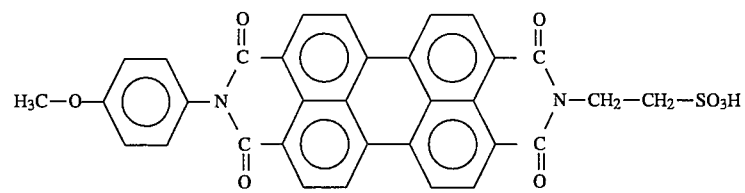

as the Zn salt is filtered off with suction at this temperature, rinsed with quinoline and methanol and dried at 80° C. The dry residue is now initially introduced into 80 g of 100% strength sulfuric acid at 25° C. and dissolved. 52 g of 50%

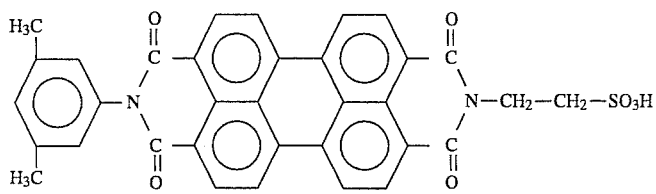

(XIII)

strength sulfuric acid are then also added dropwise to this solution, during which the temperature may rise to 80° C. When the reaction mixture has first been cooled to 25° C., it is poured into 800 ml of water. The process product which precipitates during this procedure is filtered off with suction and washed free from sulfate by treatment with water. The resulting moist press-cake is then introduced into a mixture of 100 ml of ethanol and 5.6 g of hydrochloric acid (31% strength) and extracted by stirring at the boiling point for 1 hour. Finally, the sulfonic acid liberated in this manner is filtered off with suction over a glass frit, washed with ethanol and dried at 80° C.

Yield: 6.80 g of a compound of the abovementioned formula XI, which contains 0.53% of water of crystallization, corresponding to 6.76 g of dry compound.

Analysis: taking into account 0.53% of $H_2O$ Found: C 71.7%; H 7.9%; N 4.1%; S 3.8%

Example 10

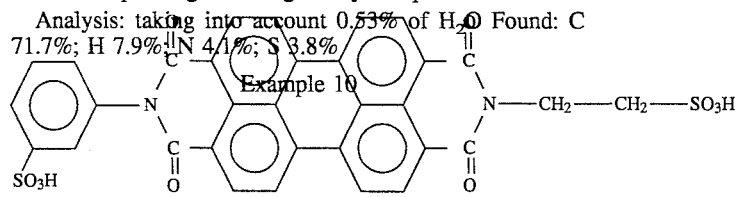

(XII)

50 ml of quinoline are initially introduced into a stirred vessel, and 4.99 g of perylene-3,4,9,10-tetracarboxylic acid monoanhydride N-mono(2'-sulfoethylimide) of the formula VIII (93.9% pure), prepared according to Example 6, as well as 6.92 g of metanilic acid and 0.5 g of zinc acetate dihydrate are then introduced in succession. The mixture is then heated to 190° C. and stirred at this temperature for 8 hours. It is then allowed to cool to 120° C. and the reaction product which has precipitated out as the Zn salt is filtered off with suction at this temperature, rinsed with quinoline and methanol and dried at 80° C.

The dry residue is now introduced into 86% of 50% strength sulfuric acid at 25° C. and the mixture is then subsequently stirred at 25° C. for 4 hours. The sulfonic acid liberated in this manner is finally filtered off with suction over a glass frit, washed free from sulfate by treatment with 31% strength hydrochloric acid and dried at 80° C. in vacuo.

Yield: 6.26 g of a compound of the abovementioned formula XII, which contains 4.4% of water of crystallization, corresponding to 5.98 g of 100% pure compound (=97.2% of theory).

Analysis: $C_{32}H_{18}N_2S_2O_{10}$ taking into account 4.4% of $H_2O$ Calculated: C 58.7%; H 2.8%; N 4.3%; S 9.8% Found: C 57.2%; H 3.1%; N 4.3%; S 9.3%

Example 11

50 ml of symmetric xylidine, 4.99 g of perylene-3,4,9,10-tetracarboxylic acid monoanhydride N-mono(2'-sulfoethylimide) of the formula VIII (93.9% pure), prepared according to Example 6, and 0.5 g of zinc acetate dihydrate are introduced into a stirred vessel in succession. The mixture is then heated to 205°–210° C. and subsequently stirred at this temperature for 8 hours. It is then allowed to cool to 25° C. and the reaction product formed as the Zn salt is filtered off with suction, rinsed with symmetric xylidine and methanol and dried at 80° C. The dry residue is now introduced into 63 g of 50% strength sulfuric acid at 25° C. and the mixture is then subsequently stirred at 25° C. for 1 hour. The sulfonic acid liberated in this manner is finally filtered off with suction over a glass frit, washed free from sulfate by treatment with 31% strength hydrochloric acid and dried at 80° C. in vacuo.

Yield: 5.75 g of a compound of the abovementioned formula XIII, which contains 3.1% of water of crystallization, corresponding to 5.57 g of 100% pure compound (=98.4% of theory).

Analysis: $C_{34}H_{22}N_2O_7S$ taking into account 3.1% of $H_2O$ Calculated: C 67.8%; H 3.7%; N 4.7%; S 5.3% Found: C 68.2%; H 3.8%; N 5.1%; S 5.1%

We claim:

1. A perylene compound containing one or two sulfonic acid groups, of the formula I

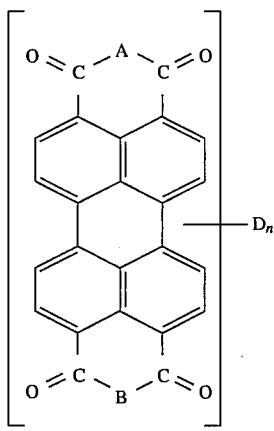

in which

A is a bivalent radical >NR$^1$ or >N—R$^2$—SO$_3^-$X$^+$ and

B is the bivalent radical >N—R$^2$—SO$_3^{-X+}$,

D is a chlorine or bromine atom or a combination thereof, and n is a number from 1 to 8;

in which, in the above radicals A and B,

R$^1$ is a hydrogen atom or a C$_1$–C$_{30}$-alkyl group or an aryl group, which can be unsubstituted or mono- or polysubstituted by halogen, sulfo, C$_1$–C$_4$-alkyl, C$_1$—C$_4$-alkoxy or phenylazo, R$^2$ is a straight-chain or branched C$_1$–C$_6$-alkylene group, and X$^+$ is the hydrogen ion H$^+$ or the equivalent M$^{m+}$/m of a metal cation from main group 1 to 5 or from sub-group 1 or 2 or 4 to 8 of the periodic system of the chemical elements, in which m is one of the numbers 1, 2 or 3; or an ammonium ion N$^+$R$^3$R$^4$R$^5$R$^6$, in which the substituents R$^3$, R$^4$, R$^5$ and R$^6$ on the quaternary N atom independently of one another are each selected from the group consisting of a hydrogen atom, C$_1$–C$_{30}$-alkyl, C$_1$–C$_{30}$-alkenyl, C$_5$–C$_{30}$-cycloalkyl, unsubstituted or by C$_1$–C$_8$-alkylated phenyl and a (poly)alkyleneoxy group —(CHR$^7$—CH$_2$—O—)$_k$—H, in which R$^7$ is hydrogen or C$_1$–C$_4$ alkyl and k is a number from 1 to 30, and in which alkyl, alkenyl, cycloalkyl, phenyl or alkylphenyl identified as R$^3$, R$^4$, R$^5$ and/or R$^6$ can moreover optionally be substituted by amino, hydroxyl and/or carboxyl; or in which the substituents R$^3$ and R$^4$, together with the quaternary N atom, can form a five- to seven-membered saturated ring system, which optionally also contains further hetero atoms; or in which the substituents R$^3$, R$^4$ and R$^5$, together with the quaternary N atom, can form a five- to seven-membered aromatic ring system, which optionally also contains further hetero atoms, and to which additional rings are optionally fused.

2. A perylene compound as claimed in claim 1, wherein, in the formula I given therein, A and B are identical and are each the bivalent radical >N— R$^2$—SO$_3^-$X$^+$ and, in which, R$^2$ is ethylene or propylene and X$^+$ is the hydrogen ion H$^+$ or the equivalent M$^{m+}$/m of a metal cation as in claim 1, which is selected from the group consisting of Li$^{1+}$, Na$^{1+}$, K$^{1+}$, Mg$^{2+}$, Ca$^{2+}$, Sr$^{2+}$, Ba$^{2+}$, Mn$^{2+}$, Cu$^{2+}$, Ni$^{2+}$, Cd$^{2+}$, Co$^{2+}$, Zn$^{2+}$, Fe$^{2+}$, Al$^{3+}$, Cr$^{3+}$ and Fe$^{3+}$; or an ammonium ion N$^+$R$^3$R$^4$R$^5$R$^6$, in which the substituents R$^3$, R$^4$ and R$^5$ on the quaternary N atom independently of one another are each a hydrogen atom or the group C$_2$–C$_3$-hydroxyalkyl, and R$^6$ is selected from the group consisting of C$_1$–C$_{30}$-alkyl, C$_1$–C$_{30}$-alkenyl, C$_1$–C$_3$-hydroxyalkyl and C$_5$–C$_6$-cycloalkyl.

3. A perylene compound as claimed in claim 1, wherein, in the formula I given therein, A is a bivalent radical >N—R$^1$ and B is the bivalent radical >N—R$^2$—SO$_3^-$X$^+$ and in which, R$^1$ is a hydrogen atom or a C$_1$–C$_{18}$-alkyl group, or is a phenyl group, which can be unsubstituted or substituted by chlorine, sulfo, bromine, methyl, ethyl, methoxy and/or ethoxy, R$^2$ is ethylene or propylene and X$^+$ is the hydrogen ion H$^+$ or the equivalent M$^{m+}$/m of a metal cation as in claim 1, selected from the group consisting of Li$^{1+}$, Na$^{1+}$, K$^{1+}$, Mg$^{2+}$, Ca$^{2+}$, Sr$^{2+}$, Ba$^{2+}$, Mn$^{2+}$, Cu$^{2+}$, Ni$^{2+}$, Cd$^{2+}$, Co$^{2+}$, Zn$^{2+}$, Fe$^{2+}$, Al$^{3+}$, Cr$^{3+}$ and Fe$^{3+}$; or an ammonium ion N$^+$R$^3$R$^4$R$^5$R$^6$, in which the substituents R$^3$, R$^4$ and R$^5$ on the quaternary N atom independently of one another are each a hydrogen atom or the group C$_2$–C$_3$-hydroxyalkyl, and R$^6$ is C$_1$–C$_{30}$-alkyl, C$_1$–C$_{30}$-alkenyl, C$_2$–C$_3$-hydroxyalkyl or C$_5$–C$_6$-cycloalkyl.

4. A process for the preparation of a perylene compound as claimed in claim 1, which comprises reacting a perylene-3,4,9,10-tetracarboxylic acid monoanhydride mono-alkali metal salt, perylene-3,4,9,10-tetracarboxylic acid monoanhydride monoimide or perylene-3,4,9,10-tetracarboxylic acid dianhydride with a primary aliphatic amine containing sulfonic acid groups, of the formula II $$H_2N—R^2—SO_3^-X^+ \qquad (II)$$

in aqueous solution, at temperatures in the range between 50° C. and 180° C. and which comprises, in the case where n>0, reacting a halogenated product of said perylene tetracarboxylic acid compounds with said amine of the formula (II), or subsequently halogenating already prepared but halogen-free products of the formula (I).

5. A process for the preparation of a perylene compound as claimed in claim 1, which comprises reacting a perylene-3,4,9,10-tetracarboxylic acid monoanhydride mono-alkali metal salt, perylene-3,4,9,10-tetracarboxylic acid monoanhydride monoimide or perylene-3,4,9,10-tetracarboxylic acid dianhydride with a primary aliphatic amine containing sulfonic acid groups, of the formula II $$H_2N—R^2—SO_3^-X^+ \qquad (II)$$

in a high-boiling inert organic solvent at a temperature >100° C., optionally in the presence of a catalyst and which comprises, in the case where n>0, reacting a halogenated product of said perylene tetracarboxylic acid compounds with said amine of the formula (II), or subsequently halogenating already prepared but halogen-free products of the formula (I).

6. A coloring agent for pigmenting high molecular weight organic materials of natural or synthetic origin which material is in the form of a plastic composition, melt, spinning solution, varnish, paint or printing ink comprising a perylene compound as claimed in claim 1.

7. The perylene compound of the formula V

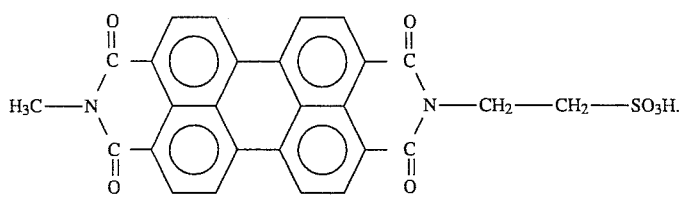

(V)

8. The process as claimed in claim 4, wherein said reacting step is carried out under alkaline pH conditions.

9. The process as claimed in claim 5, wherein said reacting step is carried out at a temperature in the range between 180° C. and 230° C.

10. A perylene compound containing one or two sulfonic acid groups, of the formula I

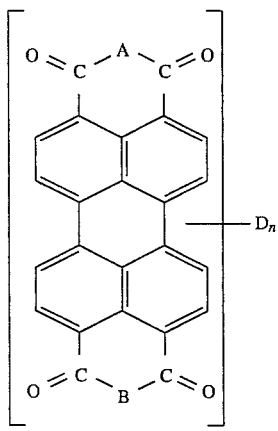

in which

A is a bivalent radical $>NR^1$ and

B is the bivalent radical $>N-R^2-SO_3^-X^+$,

D is a chlorine or bromine atom and, n is a number from 0 to 8;

in which, $R^1$ is a hydrogen atom or a $C_1-C_{30}$-alkyl group or an aryl group, which can be unsubstituted or mono- or polysubstituted by halogen, sulfo, $C_1-C_4$-alkyl, $C_1-C_4$-alkoxy or phenylazo, $R^2$ is a straight-chain or branched $C_1-C_6$-alkylene group, and $X^+$ is the hydrogen ion $H^+$ or the equivalent $M^{m+}/m$ of a metal cation from main group 1 to 5 or from sub-group 1 or 2 or 4 to 8 of the periodic system of the chemical elements, in which m is one of the numbers 1, 2 or 3; or an ammonium ion $N^+R^3R^4R^5R^6$, in which the substituents $R^3$, $R^4$, $R^5$ and $R^6$ on the quaternary N atom independently of one another are each a hydrogen atom, $C_1-C_{30}$-alkyl, $C_1-C_{30}$-alkenyl, $C_5-C_{30}$-cycloalkyl, unsubstituted or by $C_1-C_8$-alkylated phenyl and a (poly)alkyleneoxy group $-(CHR^7-CH_2-O-)_k-H$, in which $R^7$ is hydrogen or $C_1-C_4$ alkyl and k is a number from 1 to 30, and in which alkyl, alkenyl, cycloalkyl, phenyl or alkylphenyl identified as $R^3$, $R^4$, $R^5$ and/or $R^6$ can moreover optionally be substituted by amino, hydroxyl and/or carboxyl; or in which the substituents $R^3$ and $R^4$, together with the quaternary N atom, can form a five- to seven-membered saturated ring system, which optionally also contains further hetero atoms; or in which the substituents $R^3$, $R^4$ and $R^5$, together with the quaternary N atom, can form a five- to seven-membered aromatic ring system, which optionally also contains further hetero atoms, and to which additional rings are optionally fused.

11. A perylene compound as claimed in claim 10, wherein

A is a bivalent radical $>NR^1$ $R^1$ is hydrogen or $C_1-C_4$-alkyl and $X^+$ is the cation $H^+$ or $Ca^{2+}/2$ or an ammonium ion $N^+H_3R^6$, in which $R^6$ is $C_1-C_{30}$-alkyl, $C_1-C_{30}$-alkenyl, $C_2-C_3$-hydroxyalkyl or $C_5-C_6$-cycloalkyl.

12. A coloring agent for pigmenting high molecular weight organic materials of natural or synthetic origin which material is in the form of a plastic composition, melt, spinning solution, varnish, paint or printing ink comprising a perylene compound as claimed in claim 10.

13. A perylene pigment of the formula (I)

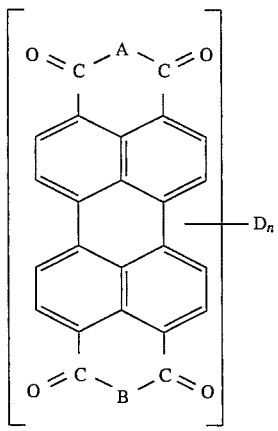

in which

A and B are each the bivalent radical $>N-R^2-SO_3^-X^+$,

D is a chlorine or bromine atom, n is a number from 0 to 8, $R^2$ is a straight-chain or branched $C_1-C_6$-alkylene group, and $X^+$ is the equivalent $M^{m+}/m$ of a metal cation from main group 2 to 5 or from sub-group 1 or 2 or 4 to 8 of the periodic system of the chemical elements, in which m is one of the numbers 1,2 or 3; or an ammonium ion $N^+R^3R^4R^5R^6$, in which the substituents $R^3$, $R^4$, $R^5$ and $R^6$ on the quaternary N atom independently of one another are each a hydrogen atom, $C_1-C_{30}$-alkyl, $C_1-C_{30}$-alkenyl, $C_5-C_{30}$-cycloalkyl, unsubstituted or by $C_1-C_8$-alkylated phenyl and a (poly) alkyleneoxy group $-(CHR^7-CH_2-O-)_k-H$ in which $R^7$is hydrogen or $C_1-C_4$-alkyl and k is a number from 1 to 30, and in which alkyl, alkenyl, cycloalkyl, phenyl or alkylphenyl identified as $R^3$, $R^4$, $R^5$ and/or $R^6$ can moreover optionally be substituted by amino, hydroxyl, and/or carboxyl; or in which the substituents $R^3$ and $R^4$, together with the quaternary N atom, can form a fiveto seven-membered saturated ring system, which optionally also contains further hetero atoms; or in which the substituents $R^3$, $R^4$ and $R^5$, together with the quaternary N atom can form a five- to seven-membered aromatic ring system, which optionally also contains further hetero atoms, and to which additional rings are optionally fused.

14. A perylene pigment as claimed in claim 13, in which $R^2$ is ethylene or propylene and $X^+$ is $Ca^{2+}/2$ or an ammonium ion $N^+H_3R^6$, in which $R^6$ is $C_1$–$C_{30}$-alkyl, $C_2$–$C_{30}$-alkenyl, $C_2$–$C_3$-hydroxyalkyl or $C_5$–$C_6$-cycloalkyl.

15. A pigment formulation comprising a pigment selected from the group consisting of azo, quinacridone and perylene pigments, and a pigment disperser of the formula (I)

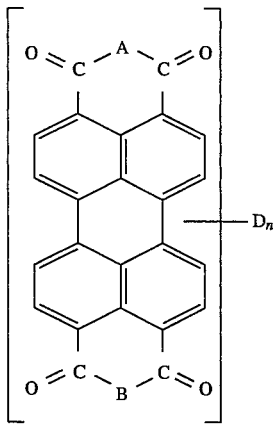

(I)

in which

A is a bivalent radical >$NR^1$ or >N—$R^2$—$SO_3^-$—$X^+$ and

B is the bivalent radical >N—$R^2$—$SO_3^-$—$X^+$,

D is a chlorine or bromine atom or a combination thereof, and n is a number from 0 to 8;

in which, $R^1$ is a hydrogen atom or a $C_1$–$C_{30}$-alkyl group or an aryl group, which can be unsubstituted or mono- or polysubstituted by halogen, sulfo, $C_1$–$C_4$-alkyl, $C_1$–$C_4$-alkoxy or phenylazo, $R^2$ is a straight-chain or branched $C_1$–$C_6$-alkylene group, and $X^+$ is the hydrogen ion $H^+$ or the equivalent $M^{m+}/m$ of a metal cation from main group 1 to 5 or from sub-group 1 or 2 or 4 to 8 of the periodic system of the chemical elements, in which m is one of the numbers 1,2 or 3; or an ammonium ion $N^+R^3R^4R^5R^6$, in which the substituents $R^3$, $R^4$, $R^5$ and $R^6$ on the quaternary N atom independently of one another are each selected from the group consisting of a hydrogen atom, $C_1$–$C_{30}$-alkyl, $C_1$–$C_{30}$-alkenyl, $C_5$–$C_{30}$-cycloalkyl, unsubstituted or by $C_1$–$C_8$-alkylated phenyl and a (poly) alkyleneoxy group —($CHR^7$—$CH_2$—O—$)_k$—H, in which $R_7$ is hydrogen or $C_1$–$C_4$-alkyl and k is a number from 1 to 30, and in which alkyl, alkenyl, cycloalkyl, phenyl or alkylphenyl identified as $R^3$, $R^4$, $R^5$ and/or $R^6$ can moreover optionally be substituted by amino, hydroxyl and/or carboxyl; or in which the substituents $R^3$ and $R^4$, together with the quaternary N atom, can form a five- to seven-membered saturated ring system, which optionally also contains further hetero atoms; or in which the substituents $R^3$, $R^4$ and $R^5$, together with the quaternary N atom can form a five- to seven-membered aromatic ring system, which optionally also contains further hetero atoms, and to which additional rings are optionally fused.

* * * * *

UNITED STATES PATENT AND TRADEMARK OFFICE
CERTIFICATE OF CORRECTION

PATENT NO. : 5,466,807
DATED      : November 14, 1995
INVENTOR(S): Dietz, et. al.

It is certified that error appears in the above-indentified patent and that said Letters Patent is hereby corrected as shown below:

In Column 19, line 21, "$SO_3^{-x+}$" should be --$SO_3^- X^+$--; Column 20, line 5, "$C_1$-$C_3$-hydroxyalkyl" should be --$C_2$-$C_3$-hydroxyalkyl-- and in Column 24, line 22, "$R_7$" should be --$R^7$--.

Signed and Sealed this

Thirtieth Day of July, 1996

Attest:

BRUCE LEHMAN

*Attesting Officer*   Commissioner of Patents and Trademarks